US012748796B2

(12) United States Patent
Elistratov et al.

(10) Patent No.: US 12,748,796 B2
(45) Date of Patent: Sep. 29, 2026

(54) UNCERTAINTY-AWARE SEQUENCE MODELING

(71) Applicant: Themis AI, Inc., Cambridge, MA (US)

(72) Inventors: Iaroslav Elistratov, Alanya (TR); Qi Yang, Cambridge, MA (US); Ege Demir, Bursa (TR); Fynn Schmitt-Ulms, Cambridge, MA (US); Elaheh Ahmadi, Encino, CA (US); Alejandro Perez, Manchester, NH (US)

(73) Assignee: Themis AI, Inc., Cambridge, MA (US)

( * ) Notice: Subject to any disclaimer, the term of this patent is extended or adjusted under 35 U.S.C. 154(b) by 0 days.

(21) Appl. No.: 18/959,839

(22) Filed: Nov. 26, 2024

(65) Prior Publication Data

US 2025/0173366 A1 May 29, 2025

Related U.S. Application Data

(60) Provisional application No. 63/602,637, filed on Nov. 26, 2023.

(51) Int. Cl.
*G06F 16/334* (2025.01)
*G06F 16/3349* (2025.01)

(52) U.S. Cl.
CPC ........ *G06F 16/3349* (2019.01); *G06F 16/334* (2019.01)

(58) Field of Classification Search
CPC ........................... G06F 16/3349; G06F 16/334
See application file for complete search history.

(56) References Cited

U.S. PATENT DOCUMENTS 11,132,624 B2 * 9/2021 Chen ..................... G06F 18/213
2021/0158221 A1 * 5/2021 Marlin .................. G06F 11/079
(Continued)

FOREIGN PATENT DOCUMENTS

CN 121009498 A * 11/2025 ............. G08B 31/00
GB 2638781 A * 9/2025 ............. G06Q 50/06
WO WO-2025049586 A1 * 3/2025 ............. G06N 20/00

OTHER PUBLICATIONS

Blundell, C.; Cornebise, J.; Kavukcuoglu, K.; and Wierstra, D. 2015. Weight uncertainty in neural network. In International conference on machine learning, 1613-1622. PMLR.
(Continued)

*Primary Examiner* — Syed H Hasan
*Assistant Examiner* — Robert F May
(74) *Attorney, Agent, or Firm* — Barnes & Thornburg LLP

(57) ABSTRACT

Described herein are systems and methods for improving accuracy of model output generation. A method can include obtaining a risk-aware model and a user input, applying the risk-aware model to the user input, receiving, based on the applying, model output and corresponding risk values, comparing the corresponding risk values to a threshold risk value, and regenerating the user input based on the comparing. The method can also include iteratively performing the applying, receiving, comparing, and regenerating using the regenerated user input until one or more processing conditions is met. The user input can be regenerated in response to determining that the corresponding risk values are greater than the threshold risk value. The model output can include one or more sequences in a train-of-thought (TOT) of the risk-aware model.

26 Claims, 9 Drawing Sheets

(56) References Cited

U.S. PATENT DOCUMENTS

| | | | | |
|---|---|---|---|---|
| 2022/0027750 | A1* | 1/2022 | Poli | G06N 20/00 |
| 2022/0043735 | A1* | 2/2022 | Lavania | G06F 9/542 |
| 2022/0129804 | A1* | 4/2022 | Dooley | G06Q 10/0635 |
| 2023/0115987 | A1* | 4/2023 | Suzuki | G06N 3/08<br>706/25 |
| 2023/0207083 | A1* | 6/2023 | Zhao | G16H 50/20<br>705/2 |
| 2024/0127163 | A1 | 4/2024 | Mandalia | |
| 2024/0419917 | A1* | 12/2024 | Clement | G06N 3/045 |
| 2025/0036982 | A1* | 1/2025 | Bishof | G06N 20/00 |
| 2025/0068741 | A1* | 2/2025 | Lafon | G06F 21/554 |
| 2025/0094904 | A1* | 3/2025 | Russell | G06Q 10/0635 |
| 2025/0321733 | A1* | 10/2025 | Rahman | G06F 8/75 |
| 2026/0065065 | A1* | 3/2026 | Olaleye | G06N 3/091 |
| 2026/0154605 | A1* | 6/2026 | Nikitin | G06N 20/00 |

OTHER PUBLICATIONS

Chen, J.; and Mueller, J. 2023. Quantifying Uncertainty in Answers from any Language Model and Enhancing their Trustworthiness. arXiv:2308. 16175.

Chuang, Y.-S.; Xie, Y.; Luo, H.; Kim, Y.; Glass, J.; and He, P. 2023. DoLa: Decoding by Contrasting Layers Improves Factuality in Large Language Models. arXiv:2309.03883.

Collins, K. M.; Barker, M.; Zarlenga, M. E.; Raman, N.; Bhatt, U.; Jamnik, M.; Sucholutsky, I.; Weller, A.; and Dvijotham, K. 2023. Human Uncertainty in Concept-Based AI Systems. arXiv:2303. 12872.

Damianou, A.; and Lawrence, N. D. 2013. Deep gaussian processes. In Artificial intelligence and statistics, 207-215. PMLR.

Devlin, J.; Chang, M.-W.; Lee, K.; and Toutanova, K. 2018. BERT: Pre-training of Deep Bidirectional Transformers for Language Understanding. arXiv preprint arXiv:1810.04805.

Dong, L.; Quirk, C.; and Lapata, M. 2018. Confidence modeling for neural semantic parsing. arXiv preprint arXiv:1805.04604.

El-Yaniv, R.; et al. 2010. On the Foundations of Noise-free Selective Classification. Journal of Machine Learning Research, 11(5).

Gal, Y.; and Ghahramani, Z. 2016. Dropout as a bayesian approximation: Representing model uncertainty in deep learning. In international conference on machine learning, 1050-1059. PMLR.

Geifman, Y.; and El-Yaniv, R. 2017. Selective classification for deep neural networks. Advances in neural information processing systems, 30.

Geiger, A.; Cases, I.; Karttunen, L.; and Potts, C. 2019. Posing fair generalization tasks for natural language inference. arXiv preprint arXiv:1911.00811.

Gondek, David C., et al. "A framework for merging and ranking of answers in DeepQA." IBM Journal of Research and Development 56.3.4 (2012): 14-1.

Guo, C.; Pleiss, G.; Sun, Y.; and Weinberger, K. Q. 2017. On calibration of modern neural networks. In International conference on machine learning, 1321-1330. PMLR.

Guo, Z.; Schlichtkrull, M.; and Vlachos, A. 2022. A survey on automated fact-checking. Transactions of the Association for Computational Linguistics, 10: 178-206.

Jiang, Z.; Araki, J.; Ding, H.; and Neubig, G. 2021. How can we know when language models know? on the calibration of language models for question answering. Transactions of the Association for Computational Linguistics, 9: 962-977.

Kamath, A.; Jia, R.; and Liang, P. 2020. Selective question answering under domain shift. arXiv preprint arXiv:2006.09462.

Kuchaiev, O.; Li, J.; Nguyen, H.; Hrinchuk, O.; Leary, R.; Ginsburg, B.; Kriman, S.; Beliaev, S.; Lavrukhin, V.; Cook, J.; et al. 2019. Nemo: a toolkit for building ai applications using neural modules. arXiv preprint arXiv:1909.09577.

Lakshminarayanan, B.; Pritzel, A.; and Blundell, C. 2017. Simple and scalable predictive uncertainty estimation using deep ensembles. Advances in neural information processing systems, 30.

Lemay, A.; Hoebel, K.; Bridge, C. P.; Befano, B.; De San Jose, S.; Egemen, D.; Rodriguez, A. C.; Schiffman, M.; Campbell, J. P.; and Kalpathy-Cramer, J. 2022. Improving the repeatability of deep learning models with Monte Carlo dropout. npj Digital Medicine, 5(1): 174.

Lin, S.; Hilton, J.; and Evans, O. 2021. TruthfulQA: Measuring how models mimic human falsehoods. arXiv preprint arXiv:2109.07958.

Lin, Z.; Trivedi, S.; and Sun, J. 2023. Generating with Confidence: Uncertainty Quantification for Black-box Large Language Models. arXiv:2305.19187.

Lolla, S.; Elistratov, I.; Perez, A.; Ahmadi, E.; Rus, D.; and Amini, A. 2022. Capsa: A Unified Framework for Quantifying Risk in Deep Neural Networks. In 5th Robot Learning Workshop: Trustworthy Robotics.

Lolla, S.; Elistratov, I.; Perez, A.; Ahmadi, E.; Rus, D.; and Amini, A. 2023. Capsa: A Unified Framework for Quantifying Risk in Deep Neural Networks. arXiv:2308.00231.

Manakul, P.; Liusie, A.; and Gales, M. J. F. 2023. SelfCheckGPT: Zero-Resource Black-Box Hallucination Detection for Generative Large Language Models. arXiv:2303.08896.

Miao, N.; Teh, Y. W.; and Rainforth, T. 2023. SelfCheck: Using LLMs to Zero-Shot Check Their Own Step-by-Step Reasoning. arXiv:2308.00436.

Mobiny, A.; Yuan, P.; Moulik, S. K.; Garg, N.; Wu, C. C.; and Van Nguyen, H. 2021. Dropconnect is effective in modeling uncertainty of bayesian deep networks. Scientific reports, 11(1): 5458.

Nix, D. A.; and Weigend, A. S. 1994. Estimating the mean and variance of the target probability distribution. In Proceedings of 1994 IEEE international conference on neural networks (ICNN'94), vol. 1, 55-60. IEEE.

Peñas, Anselmo, et al. "Overview of ResPubliQA 2009: Question answering evaluation over European legislation." Multilingual Information Access Evaluation I. Text Retrieval Experiments: 10th Workshop of the Cross-Language Evaluation Forum, CLEF 2009, Corfu, Greece, Sep. 30-Oct. 2, 2009, Revised Selected Papers 10. Springer Berlin Heidelberg, 2010.

Quach, V.; Fisch, A.; Schuster, T.; Yala, A.; Sohn, J. H.; Jaakkola, T. S.; and Barzilay, R. 2023. Conformal Language Modeling. arXiv:2306.10193.

Rajpurkar, P.; Jia, R.; and Liang, P. 2018. Know What You Don't Know: Unanswerable Questions for SQuAD. arXiv:1806.03822.

Rajpurkar, P.; Zhang, J.; Lopyrev, K.; and Liang, P. 2016. SQuAD: 100,000+ Questions for Machine Comprehension of Text. arXiv:1606. 05250.

Rodriguez, P.; Feng, S.; Iyyer, M.; He, H.; and Boyd-Graber, J. 2021. Quizbowl: The Case for Incremental Question Answering. arXiv:1904.04792.

Sellam, T.; Das, D.; and Parikh, A. P. 2020. BLEURT: Learning robust metrics for text generation. arXiv preprint arXiv:2004.04696.

Shen, M.; Bu, Y.; Sattigeri, P.; Ghosh, S.; Das, S.; and Wornell, G. 2022. Post-hoc Uncertainty Learning using a Dirichlet Meta-Model. arXiv:2212.07359.

Srivastava, N.; Hinton, G.; Krizhevsky, A.; Sutskever, I.; and Salakhutdinov, R. 2014. Dropout: a simple way to prevent neural networks from overfitting. The journal of machine learning research, 15(1): 1929-1958.

Touvron, H.; Martin, L.; Stone, K.; Albert, P.; Almahairi, A.; Babaei, Y.; Bashlykov, N.; Batra, S.; Bhargava, P.; Bhosale, S.; et al. 2023. Llama 2: Open foundation and fine-tuned chat models. arXiv preprint arXiv:2307.09288.

Wang, M.; et al. 2006. A survey of answer extraction techniques in factoid question answering. Computational Linguistics, 1(1): 1-14.

Wei, Jason, et al. "Chain-of-thought prompting elicits reasoning in large language models." Advances in neural information processing systems 35 (2022): 24824-24837.

Weng, Y.; Zhu, M.; He, S.; Liu, K.; and Zhao, J. 2022. Large language models are reasoners with self-verification. arXiv preprint arXiv:2212.09561.

Wu, Yonghui, et al. "Google's neural machine translation system: Bridging the gap between human and machine translation." arXiv preprint arXiv:1609.08144 (2016).

Yang, Qi, et al. "Uncertainty-aware language modeling for selective question answering." arXiv preprint arXiv:2311.15451 (2023).

(56) References Cited

OTHER PUBLICATIONS

Zhu, Yukun, et al. "Aligning books and movies: Towards story-like visual explanations by watching movies and reading books." Proceedings of the IEEE international conference on computer vision. 2015.

* cited by examiner

400

Algorithm 1: Uncertainty-Aware Selective Question Answering

```
Input: Model f_W(·), UQ Metrics θ, Questions Q
Initialize:
P ← ∅
g(·) ← Φ_θ(f_W)                      ▷ Uncertainty-Aware Model Conversion
foreach q ∈ Q do
    for i ∈ 1..T do
        ŷ, σ ← g(q)                                           ▷ Inference
        if σ < γ then
            P ← P ∪ {(ŷ, σ)}                        ▷ Selected Predictions
Return: P
```

FIG. 4

500

Table 1: Accuracy of model per uncertainty method.

| | **BERT-base SQuAD 2.0** | | | |
|---|---|---|---|---|
| | Baseline | MVE | Ensemble | MC |
| Exact | 72.00% | 73.12% | 74.96% | 72.72% |
| F1 | 75.17% | 76.27% | 77.83% | 75.97% |
| HasAns Exact | 70.58% | 69.18% | 70.86% | 72.42% |
| HasAns F1 | 76.94% | 75.51% | 76.62% | 78.93% |
| NoAns Exact | 73.41% | 77.04% | 79.04% | 73.02% |
| NoAns F1 | 73.41% | 77.04% | 79.04% | 73.02% |

FIG. 5

700

Table 2: Selective question answering accuracy. Accuracy of the model across increasing levels of confidence percentile thresholds (i.e., top-to-bottom, least-to-most confident). Bold indicates top performing uncertainty method per confidence level.

(a) BERT-base on SQuAD

| Percentile | Logit Probability | MVE | Ensemble | MC | Composed | Coverage |
|---|---|---|---|---|---|---|
| 0.0 | 70.58% | 69.19% | 70.87% | **72.41%** | **72.41%** | 100.00% |
| 10.0 | 73.76% | 71.98% | 73.67% | 75.30% | **75.35%** | 90.00% |
| 20.0 | 75.41% | 74.59% | 77.37% | 77.79% | **77.84%** | 80.00% |
| 30.0 | 76.38% | 76.67% | 79.93% | 80.12% | **80.40%** | 70.00% |
| 40.0 | 76.50% | 79.11% | 81.64% | 81.95% | **82.37%** | 60.00% |
| 50.0 | 76.35% | 81.28% | 83.64% | 83.91% | **84.38%** | 50.00% |
| 60.0 | 76.13% | 83.13% | 85.31% | 85.32% | **85.62%** | 40.00% |
| 70.0 | 75.66% | 85.67% | 87.28% | 86.96% | **87.86%** | 30.00% |
| 80.0 | 73.61% | 87.69% | 89.09% | 89.29% | **90.13%** | 20.00% |
| 85.0 | 71.24% | 88.76% | 90.16% | 90.56% | **91.24%** | 15.00% |
| 90.0 | 64.92% | 89.54% | 90.83% | 91.57% | **94.10%** | 10.00% |
| 95.0 | 49.16% | 90.24% | 91.18% | **93.27%** | **93.27%** | 5.00% |
| 98.0 | 18.49% | 91.60% | 89.75% | **94.12%** | 93.28% | 2.00% |
| 99.0 | 3.33% | 93.33% | 91.67% | 95.00% | **96.67%** | 1.00% |
| 99.9 | 0.00% | **100.00%** | **100.00%** | 83.33% | 83.33% | 0.10% |

(b) Llama 2-Chat 7B on TruthfulQA

| Percentile | Logit Probability | Epistemic | Coverage |
|---|---|---|---|
| 0.0 | **57.17 %** | **57.17%** | 100.0% |
| 10.0 | 58.1% | **60.63%** | 90.00% |
| 20.0 | 59.78% | **61.91%** | 80.00% |
| 30.0 | 61.12% | **63.56%** | 70.00% |
| 40.0 | 61.87% | **64.86%** | 60.00% |
| 50.0 | 61.24% | **67.1%** | 50.0% |
| 60.0 | 58.66% | **69.25%** | 40.00% |
| 70.0 | 57.45% | **70.19%** | 30.00% |
| 80.0 | 54.07% | **71.54%** | 20.00% |
| 85.0 | 52.43% | **75.14%** | 15.00% |
| 90.0 | 53.66% | **79.67%** | 10.00% |
| 95.0 | 54.84% | **91.94%** | 5.00% |
| 98.0 | 52.0% | **96.0%** | 2.00% |
| 99.0 | 38.46% | **100.0%** | 1.00% |
| 99.9 | 0.0% | **100.0%** | 0.15% |

FIG. 7

800

Table 3: Efficiency benchmark per uncertainty method.

| | **Models** | | | | |
|---|---|---|---|---|---|
| | Baseline | MVE | Ensemble | MC | Composed |
| Parameters ($\times 10^9$) | 109.484 | 109.487 | 547.419 | 109.484 | 109.487 |
| Inference Time | 1.00 | 1.016 | 4.997 | 1.1915 | 1.2075 |

FIG. 8

UNCERTAINTY-AWARE SEQUENCE MODELING

RELATED APPLICATIONS

The present disclosure claims priority to U.S. Provisional Patent Application No. 63/602,637, entitled "Uncertainty-aware Language Modeling for Selective Question Answering," which was filed on Nov. 26, 2023, and which is incorporated by reference herein in its entirety.

TECHNICAL FIELD

This disclosure generally describes devices, systems, and methods related to computer-automated techniques and algorithms for identifying and assessing risk in outputs of sequence-based machine learning models for optimization.

BACKGROUND

Sequence models have demonstrated abilities in natural language tasks, including question answering (QA), where a model can receive a question as input and output a response answer. To robustly answer questions accurately, the model should understand context and ground its outputs in knowledge obtained from training data, which typically may contain conflicting information. When such models fail in QA tasks, it can be associated with a limited understanding of output confidence, out-of-domain data, ambiguity in inputs, inconsistent training data, and/or hallucinations. However, existing approaches lack a reliable way to determine when models' outputs can be trusted, which is essential for real-world applications.

One way to interpret this confidence is by relying on the softmax classifier probabilities. However, these probabilities usually do not reflect the actual confidence. Similarly, an out-of-domain (OOD) calibrator can be trained to detect OOD inputs but can require known or synthetic out-of-domain samples, and may not consider other sources of inaccuracies, such as over-represented features and/or ambiguous labels. Other approaches may include modeling and/or estimating model's uncertainty, fine-tuning calibrators to consider entropy, perplexity, and other metrics, and calculating output consistency.

Accordingly, there is a need for accurate and efficient ways to estimate uncertainty directly from the model given an input, without the need of external components, and a way to integrate this uncertainty with sequence models that output tokens iteratively.

SUMMARY

The disclosure generally describes technology for improving output quality of sequence models by utilizing estimated risk values associated with a given model output. More specifically, in some implementations, risk estimates can be integrated into a tree of thoughts (TOT) reasoning process (e.g., an algorithm or other computerized technique that can be used for finding best reasoning steps for a given question). The TOT can prompt a sequence model, such as a large language model (LLM), to output its reasoning step by step, where output at each step logically flows from a previous reasoning step. Risk estimates can be used to identify where and when logic breaks at some particular reasoning step(s), regenerate that particular reasoning step (s), and continue generation of the reasoning process in this way. In some implementations, the action of regenerating that particular reasoning step(s) can occur multiple times, the current reasoning step(s) that is selected can be, for example, the generated step(s) having a lowest risk value. In some implementations, risk estimates for a given output can be compared against a predetermined threshold. If the risk exceeds this threshold (which can indicate, for example, high model uncertainty), the model can be configured to decline responding to the prompt, enabling selective question answering.

Using the disclosed technology, a model can be transformed into its risk-aware variant. The risk-aware variant can be, for example, an uncertainty-aware model. The uncertainty-aware model can receive a prompt as input and provide output that includes, for example, a risk metric, such as uncertainty. In at least some implementations, the disclosed technology can provide an uncertainty-based framework for selective question answering that accounts for, by way of examples, epistemic and/or aleatoric uncertainty. Each output sequence, or thought, from the model can be a state in a tree. During each iteration, the model output can be evaluated on previous states, which can produce new states, and corresponding output uncertainty values or other risk metric value. New states can be added to the tree, for example if such new states result in lower uncertainty estimates, and/or other lower risk metric values. As a result of the disclosed techniques, the tree can be gradually built up in memory and successively become better at producing high quality output. In some implementations, a path of least uncertainty may also be used to generate optimized answers.

Although the disclosed technology is described from the perspective of extractive LLMs (e.g., masked-language models) and generative LLMs (e.g., autoregressive models), these are merely illustrative examples. The disclosed technology can apply to a variety of different use cases, models, and/or tasks. The disclosed technology is model-agnostic and data-agnostic, lightweight, and self-sufficient, meaning it does not rely on external models or systems. The external models or systems can include any models or systems that are not part of the disclosed technology, but may be needed for the operation or functioning of the disclosed technology. The external models can include but are not limited to pre-existing machine learning models, algorithms, or statistical models that the disclosed technology may rely on for predictions, analysis, or other tasks. The external systems can include but are not limited to external software systems, platforms, or infrastructure that the disclosed technology may rely on for resources, data processing, storage, or other services. For example, an external system can include a cloud service, a third-party API, and/or another application. While individual uncertainty quantification methods can increase performance on a selective QA task, a combination of such methods and uncertainty/risk metrics can yield improved accuracy. Accordingly, the disclosed technology can provide for converting a model into its risk-aware variant and composing metrics and methods automatically for the risk-aware variant to improve the model, and its accuracy in generating output.

One or more embodiments described herein includes a method for improving accuracy of model output generation. The method includes obtaining a risk-aware model and a user input and applying the risk-aware model to the user input. The method further includes receiving, based on the applying, model output and corresponding risk values, comparing the corresponding risk values to a threshold risk value, and regenerating the user input based on the comparing.

The method can optionally include one or more of the following features. For example, the method can include iteratively performing the applying, the receiving, the comparing, and the regenerating using the regenerated user input until one or more processing conditions is met. The method can additionally or alternatively include, in response to the one or more processing conditions being met, analyzing the outputted corresponding risk values against one or more risk criteria, selecting, based on the analyzing, a user input having an outputted corresponding risk value that satisfies the one or more risk criteria, and returning the selected user input to a user device. In at least some implementations, the method can include determining that the one or more processing conditions is met based on the corresponding risk values being less than the threshold risk value.

In some implementations, the user input can be regenerated in response to determining that the corresponding risk values are greater than the threshold risk value. The model output can include, for example, one or more sequences in a train-of-thought (TOT) of the risk-aware model. The corresponding risk values can include an aleatoric uncertainty value corresponding to each sequence, an epistemic uncertainty value corresponding to each sequence, and/or a bias value corresponding to each sequence.

The method can also include determining that the one or more processing conditions is met based on the model output being a final output of the risk-aware model. The method can additionally or alternatively include aggregating the corresponding risk values to generate an aggregated risk value, determining whether the aggregated risk value is less than the threshold risk value, and, in response to determining that the aggregated risk value is greater than the threshold risk value, performing the regenerating.

One or more embodiments described herein include a method for improving accuracy of model output generation. The method includes receiving a user input for a model and prepending logical instructions to the user input. The method further includes applying a risk-aware variant of the model to the user input having the prepended logical instructions and receiving, based on the applying, model output and corresponding risk values. Additionally, the method includes comparing the corresponding risk values to a threshold risk value and regenerating the user input having the prepended logical instructions based on the comparing.

The method can optionally include one or more of the above-mentioned features, and/or one or more of the following features, and/or one or more other features described herein. For example, the method can also include iteratively performing the applying, the receiving, the comparing, and the regenerating using the regenerated user input having the prepended logical instructions until a processing condition is met. Further, in response to the processing condition being met, the method can include analyzing the outputted corresponding risk values against one or more risk criteria, and selecting, based on the analyzing, a user input having an outputted corresponding risk value that satisfies the one or more risk criteria. In at least some instances, the user input having the prepended logical instructions can be regenerated in response to determining that the corresponding risk values are greater than the threshold risk value. As another example, the method can include aggregating the corresponding risk values to generate an aggregated risk value, determining whether the aggregated risk value is less than the threshold risk value, and, in response to determining that the aggregated risk value is greater than the threshold risk value, performing the regenerating.

One or more embodiments described herein includes a system for improving accuracy of model output generation. The system includes a computer system having one or more processors and memory storing instructions that, when executed by the one or more processors, cause the computer system to perform a process. The process includes obtaining a risk-aware user model and a user input and applying the risk-aware model to the user input. The process further includes receiving, based on the applying, model output and corresponding risk values, comparing the corresponding risk values to a threshold risk value, and regenerating the user input based on the comparing.

The system can optionally perform one or more of the above-mentioned features and/or one or more other features described herein.

One or more embodiments described herein includes a system for improving accuracy of model output generation. The system includes a computer system with one or more processors and memory storing instructions that, when executed by the one or more processors, cause the computer system to perform a process. The process includes receiving a user input for a model and prepending logical instructions to the user input. The process also includes applying a risk-aware variant of the model to the user input having the prepended logical instructions and receiving, based on the applying, model output and corresponding risk values. Still further, the process includes comparing the corresponding risk values to a threshold risk value and regenerating the user input having the prepended logical instructions based on the comparing.

The system can be configured to include one or more of the above-mentioned features and/or one or more other features described herein.

The disclosed technology provides greater accuracy in identifying uncertainty of a sequence than traditional approaches. Traditional approaches rely on softmax probability to determine the uncertainty of a sequence. However, softmax probability is shown to not capture model uncertainty and, therefore, cannot provide an accurate scoring function for capturing model risk. The disclosed technology, on the other hand, uses a risk value function to enhance the softmax method. These risk scores of sequences can be used as a threshold value to regenerate a new sequence when risk scores are above the threshold (i.e., giving the user a mechanism to know when to not trust a model output and regenerate a new output). This sequence rejection and regeneration mechanism can be used, for instance, for simply selective question answering tasks. The user can decide to not trust the answer of a sequence model when a question is given as input when the risk value of the output is higher than a threshold. It can also be used for TOT analysis by integrating it with graph traversal algorithms, such as Monte Carlo Tree Search (MCTS).

BRIEF DESCRIPTION OF THE DRAWINGS

This disclosure will be more fully understood from the following detailed description, taken in conjunction with the accompany drawings, in which:

FIG. 4 illustrates an example algorithm for uncertainty-aware selective question answering using the disclosed technology;

FIG. 5 is a table illustrating accuracy of a model per uncertainty method using the disclosed technology;

FIG. 7 is a table illustrating example selective question answering accuracy from performing the disclosed technology;

FIG. 8 is a table illustrating an example efficiency benchmark per uncertainty method.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Unless otherwise defined, all technical terms used herein have the same meaning as commonly understood by one of ordinary skill in the art to which this disclosure belongs.

This disclosure generally relates to technology for integrating risk with sequence models to either discard or improve uncertain sequence outputs. Generating risk estimates for every reasoning step in a tree of thoughts (TOT) can allow for identifying where and when logic breaks at a particular step(s), regenerating that particular step(s) (potentially multiple times, and then selecting as the current reasoning step the regenerated step having a lowest risk value), and continuing generation of the reasoning process in this way. As a result of performing such techniques, the model can improve quality and accuracy of the generated outputs.

A person skilled in the art will appreciate the term "sequence" is not limited to a set of vector embeddings representing text tokens, but can also include embeddings representing, for example, images, audio signals, video frames, time series data, and/or any other form of data that can be processed by the model to condition its output and/or behavior. The disclosed technology can apply to any type of input, including but not limited to text prompt input, sound wave frequencies input, image input, etc. Although the disclosed technology is described from the perspective of sequence modeling where the elements of the sequence are tokens representing text data, this is merely an illustrative, non-limiting example.

Figure 1:
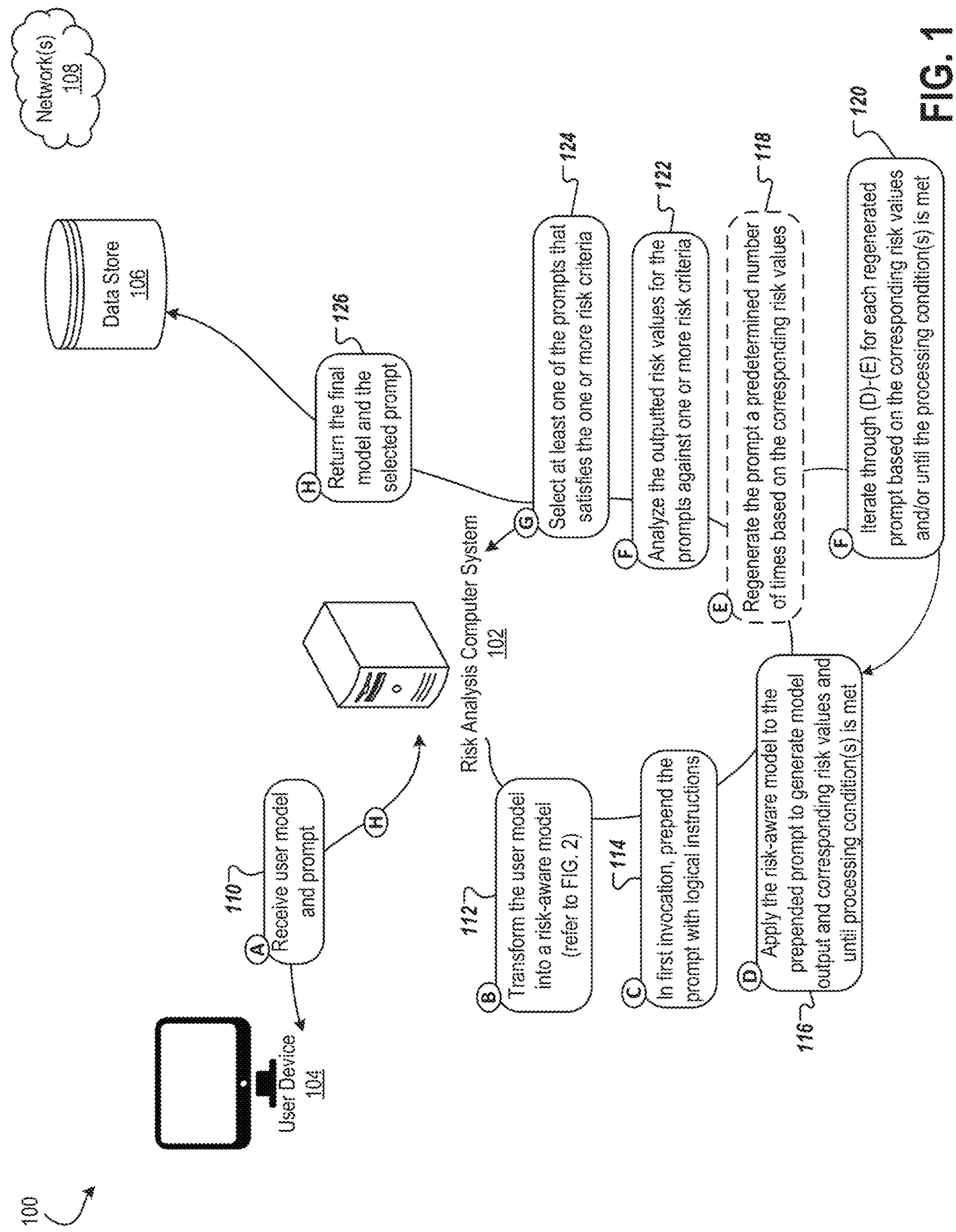
FIG. 1 is a conceptual diagram of a system for assessing risk in a tree of thoughts (TOT) of a model to regenerate a prompt a predetermined number of times.

Referring to the figures, FIG. 1 is a conceptual diagram of a system 100 for assessing risk in a TOT for a model to regenerate a model prompt having a lowest corresponding risk. The disclosed techniques can similarly be performed to assess risk in a chain-of-thought (COT). In a COT, each node, in at least some instances, can be permitted to have, at most, one (1) child node. Sometimes, a TOT can be viewed as multiple COTs in which some of the chains share common thought patterns (e.g., shared initial thought sequences). Accordingly, the disclosed technology can be applied to TOTs and/or COTs.

The system 100 can include a risk analysis computer system 102, which can communicate with a user device 104 and/or a data store 106 over network(s) 108. In some implementations, the user device 104 and/or the data store 106 may be part of the computer system 102. Sometimes, one or more of the user devices 104 and the data store 106 may be separate systems from the computer system 102 and/or remote from the computer system 102. The computer system 102 can be configured to execute software modules, engines, and/or instructions for performing the disclosed techniques.

Referring to the system 100 in FIG. 1, the risk analysis computer system 102 can receive a user model and prompt in block A (110).

Figure 2:
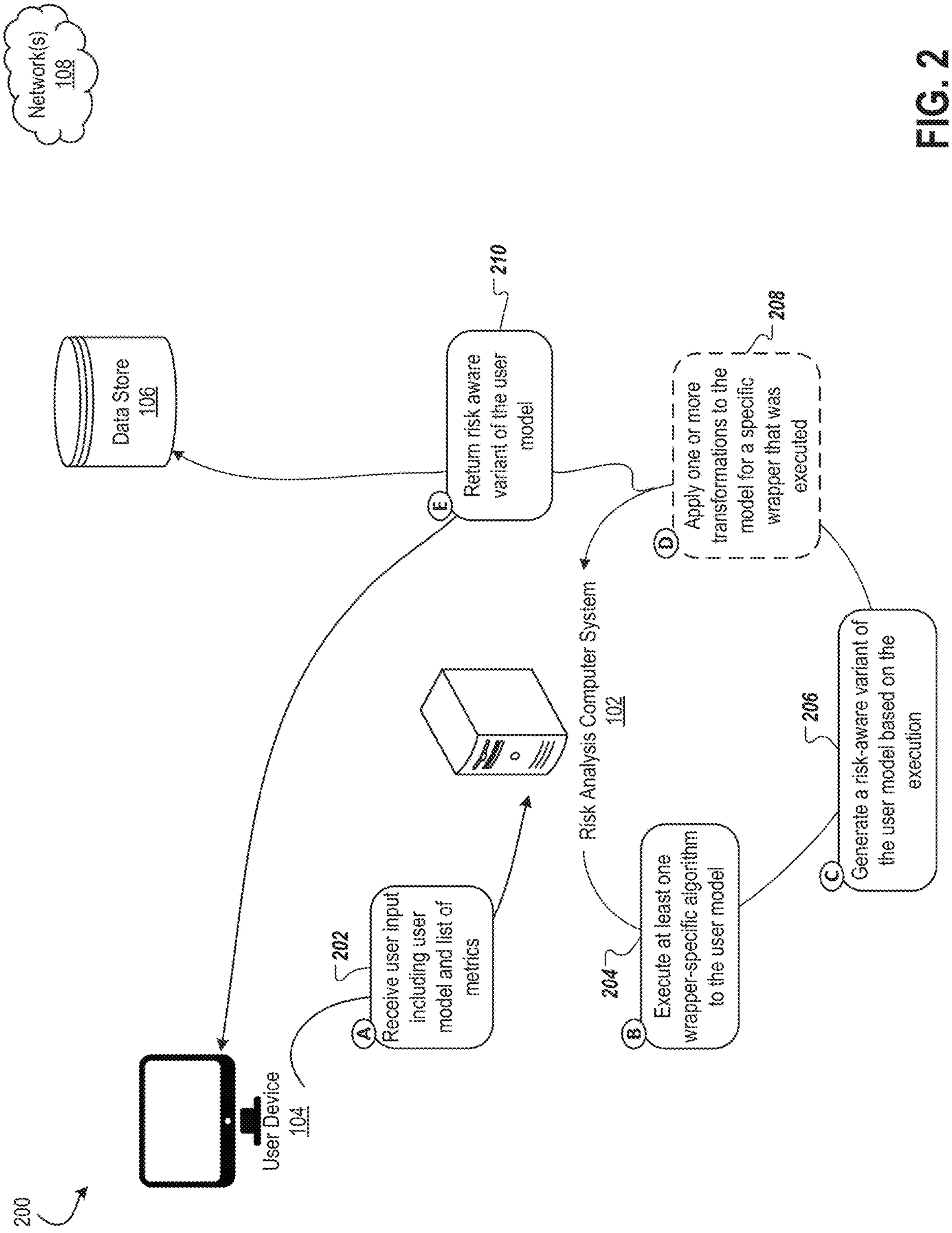
FIG. 2 is a conceptual diagram of a system that can be used to transform a model into a risk-aware variant of the model to be used with the disclosed technology.

The computer system 102 can transform the user model into a risk-aware variant of the model in block B (112). Refer to FIG. 2 for further description.

In a first invocation of the model on a given input, the computer system 102 can prepend the prompt with logical instructions, for example, to cause the model to generate multiple possible continuations of the input sequence (block C, 114). In case of other data modalities (e.g., image generation) where the model does not directly input text instructions, the disclosed techniques can introduce stochasticity into the model (e.g., dropout layers, Bayesian layers) and execute that model several times. In such instances, execution of the model can produce a different output each time. In some instances, execution of the model can provide a same output each time or sometimes. In yet some instances, two or more outputs can be similar and/or the same.

The computer system 102 can apply the risk-aware model to the prepended prompt to generate model output and corresponding risk values in block D (116). Block D (116) can be performed until processing conditions are met. A processing condition can be, for example, the model processing the prepended prompt to generate a full or complete thought.

The computer system 102 may regenerate the prompt a predetermined number of times based on analyzing the corresponding risk values against the processing condition (s) in block E (118). For example, the computer system 102 may regenerate the prompt if one or more risk values that are generated in block D (116) are greater than a predetermined threshold risk level/value. Optionally, block E (118) may not be performed, such as if the one or more risk values are less than the predetermined threshold risk level/value.

The computer system 102 can iterate through blocks D (116) and E (118) for each regenerated prompt based on analyzing the corresponding risk values and/or until the processing condition(s) is met in block F (120). For example, the computer system 102 can continue calculating the risk values for regenerated prompts and regenerating the prompts until the risk values of one of the regenerated prompts is less than the predetermined threshold risk level/value. The risk threshold can be determined heuristically, calculated algorithmically, and/or can be learned with a neural network (NN). The disclosed technology can implement one or more different techniques for determining the threshold. As an illustrative example, the threshold can be determined by executing the model described herein on a set of prompts and recording uncertainties for each output token, aggregating the recorded uncertainties with an aggregation function, then computing, for example, a value at 95th percentile. Then, if during later invocations of the model on other prompts, the output has higher risk than this value, it indicates that the prompt should be modified, and block 322 can be performed; elseblock 310 can be performed. If the risk value(s) is below the predetermined threshold, then the computer system can return the model output. In other words, low values for one or more risk estimates associated with the model output can suggest that the model successfully generalizes to the given prompt, and are indicative of higher-quality model output(s).

Once the computer system 102 has finished calculating the risk values and regenerating the prompts, the computer system 102 can analyze the outputted risk values for the prompts against one or more risk criteria (block F, 122). The one or more risk criteria can include the predetermined threshold risk level/value described above.

The computer system 102 can select at least one of the prompts that satisfies the one or more risk criteria (block G, 124). For example, the computer system 102 can select a regenerated prompt having one or more risk values (or an aggregated risk value) that is less than the predetermined threshold risk level/value. As another example, the computer system 102 can select a regenerated prompt amongst all the prompts having the lowest risk values or aggregated risk value.

The computer system 102 can then return the final model output and the selected prompt in block H (126). The prompt can be stored in the data store 106. The prompt can be transmitted to the user device 104. In some implementations, the prompt can be fed back into the computer system 102, as described further in reference to FIGS. 3A and 3B. Thus, the disclosed techniques allow for iteratively feeding the model with different prompts and selecting one or more of those prompts with the lowest output risk.

FIG. 2 is a conceptual diagram of a system 200 that can be used to transform a model into a risk-aware variant of the model to be used with the disclosed technology. One or more operations described herein for transforming the model into the risk-aware variant are described further in U.S. application Ser. No. 18/478,301, entitled "Systems and Methods for Automated Risk Assessment in Machine Learning," filed on Sep. 29, 2023, which is incorporated by reference herein in its entirety. The uncertainty-aware model conversion provided for herein can produce a new model capable of estimating multiple different types of uncertainty. The model can estimate, for example aleatoric uncertainty. Additionally, or alternatively, the model can estimate epistemic uncertainty and/or bias.

In the example system 200, user input, which includes a user model (e.g., arbitrary model that is not previously seen) and list of metrics, can be received from the user device 104 (block A, 202) at the risk analysis computer system 102. The user input can include, for example, an original user model, and the original user model can include, for example, at least a model architecture.

The computer system 102 may then execute at least one wrapper-specific algorithm to generate a risk aware variant of the user model (block B, 204). For example, the computer system 102 can apply one or more model modifications to the model. As another example, the computer system 102 can apply one or more model augmentations to the modified model. As yet another non-limiting example, the computer system 102 can apply a loss function modified to the augmented and/or modified model. These applications can occur as standalone wrapper operations, or multiple applications can occur in the same risk aware variant analysis.

In some implementations, the computer system 102 can optionally apply one or more other transformations, such as search, add, delete, and/or replace transformations, to the model for a specific wrapper that was executed (block D, 208). The search transformations can include, for example, automatically searching through the model and identifying specific instances of locations/computational operations in the model that can be transformed. Multiple criteria can be used to identify what parts of the model need to be transformed. Another criterion can be based on understanding what specific transformations each wrapper is needed to apply. Accordingly, the transformations described herein can be represented as modifications of the model's computational graph without modifying actual user code that generated the model. As an illustrative example, a transformation to represent algorithmically may be an insertion of a mathematical operation in the graph representing the user model. Because the original model is received as input, the computer system 102 can identify what mathematical operations the model computes. The computer system may narrow down possible places in the model that are fit for inserting a layer. For example, for each wrapper, a set of mathematical operations in the graph that the computer system needs to search for can be identified and if the computer system finds these operations, the computer system may insert that layer after that found operation.

Any transformations of a user model inside a wrapper can be performed as described above in reference to searching components inside that model and inserting/deleting/replacing these components. The one or more model components can include at least one of: (i) one or more mathematical operations performed by the original model; (ii) subgraphs of the one or more mathematical operations, the subgraphs being one or more respective layers; and/or (iii) one or more groups of the subgraphs.

As part of applying transformations, the computer system 102 can add one or more layers to the model in one or more places that are specific to a particular wrapper. The computer system may automatically transform the model into its risk aware variant, for example by applying a wrapper to it. The wrapper can determine: (i) which layer or layers (groups of mathematical, computational operations) to add, remove, and/or replace; and (ii) what location(s) in the model to make the addition, removal, and/or replacement. An epistemic wrapper, for example, can be configured to receive a user model and transform that model by, for example, automatically adding one or more probabilistic layers (e.g., a group of mathematical operations that represent a probabilistic layer). The wrapper may also be configured to run the model T times to accurately calculate the uncertainty. The value T can be determined in a number of ways. As merely illustrative examples, the value T can be: determined empirically for a particular class of models; selected by the user based on, for instance, time and/or compute constraints; optimized for a custom cost function that takes into account uncertainty, time, and/or compute costs; learned with an NN; and/or any combination thereof. As yet another illustrative example, a lightweight multilayer perception NN (MLP) can be trained to predict the number of iterations required to achieve the optimal modified prompt (as indicated, for instance, by the output risk) within some threshold margin, thereby avoiding redundant computations. By way of non-limiting examples, any of the augmentations may include adding to the model (or to the original model) groups of model components whose outputs may predict standard deviations of ground truth labels (e.g., in addition to predicting the ground truth labels themselves). Such augmentations may include adding one or more model components after each model component of a particular type (and/or by any other criteria), and/or to a group or groups of layers of the original model (e.g., subgraphs of nodes in the computational graph representing the model).

Subsequently, the computer system 102 can return the risk-aware variant of the user model (block E, 210). The risk-aware variant of the user model may further be trained and executed to generate and output one or more risk factors associated with the user model. For example, the computer system 102 can determine representation bias, epistemic uncertainty, aleatoric uncertainty, any combination thereof, and/or other types of risk factors/categories (which can be defined by the user's list of metrics in at least some implementations). The computer system 102 can store the risk factors and/or the risk aware variant more generally in the data store 106 and in association with the original user model (e.g., using a unique identifier/ID that corresponds to and identifies the original user model). The computer system 102 can transmit the risk factors and/or the risk aware variant to the user device 104 for presentation at the device to a relevant user. The computer system 102 can also generate and return one or more recommendations for adjusting the original user model. Such recommendations can be stored in the data store 106 and/or transmitted to the relevant user device 104. As described further below, the risk factors and/or the risk aware variant may further be used by the computer system 102 to perform the disclosed techniques, such as identifying sub-optimal nodes and/or combinations of operations in the model and/or optimizing one or more of those nodes and/or combinations of operations.

Figure 3A:
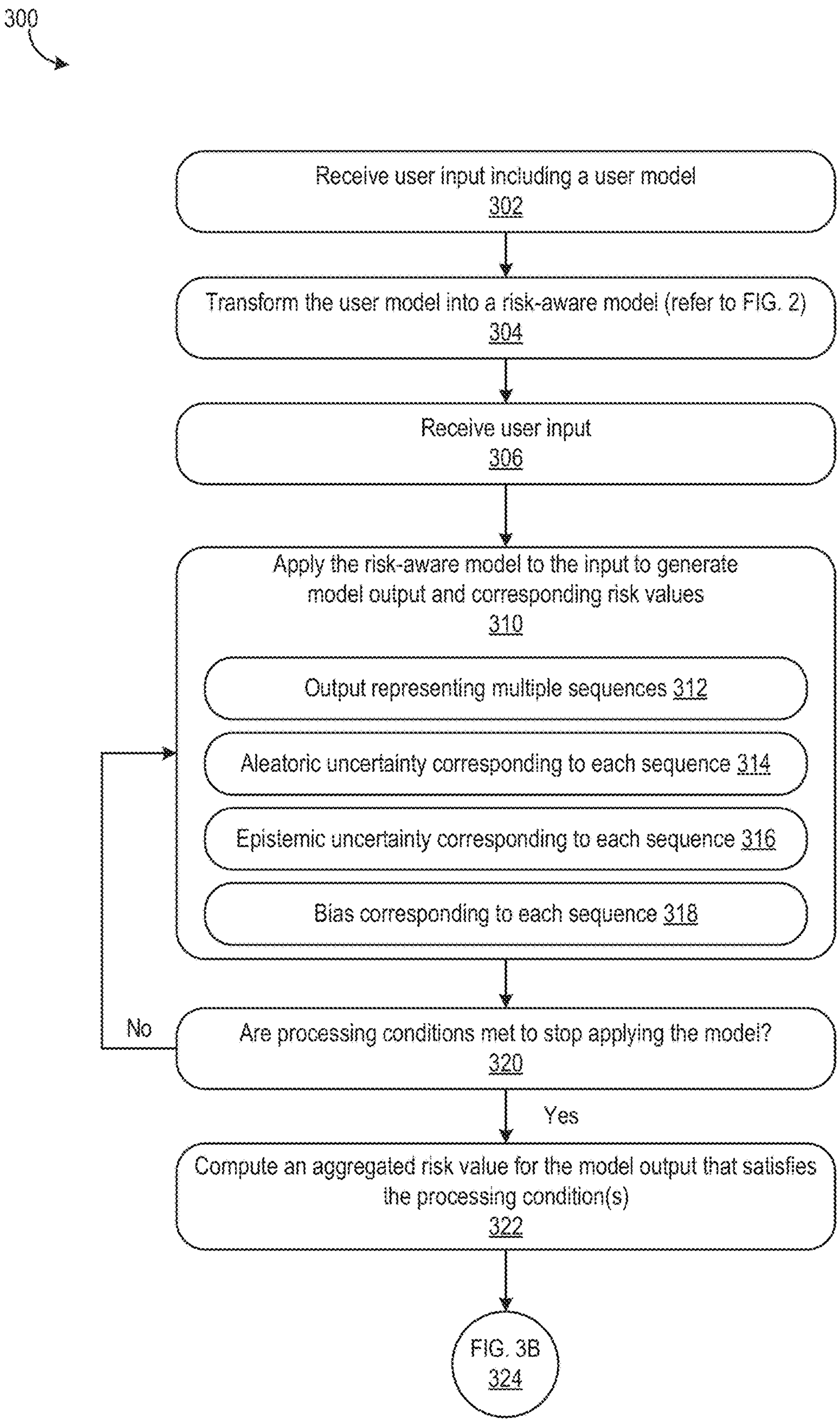
FIGS. 3A and 3B together illustrate a flowchart of a process for optimizing a TOT of a model to cause the model to generate outputs with improved accuracy.
Figure 3B:
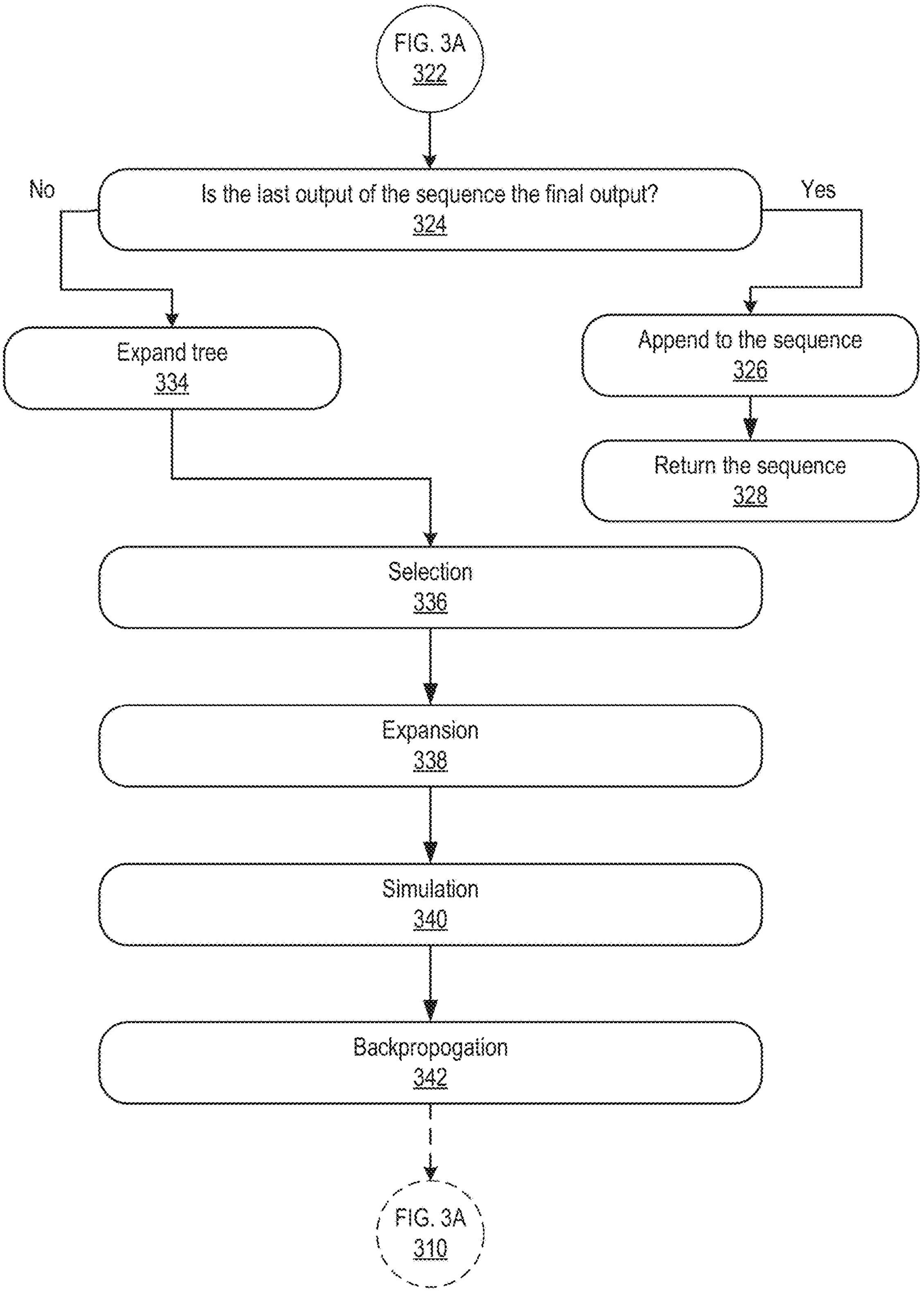

FIGS. 3A and 3B are flowcharts of a process 300 for optimizing a TOT of a model to find model outputs having the lowest risk and improved accuracy. The process 300 can be performed by the risk analysis computer system 102 described herein. The process 300 can also be performed by any other computing system, computing device, network of computing devices, and/or cloud-based system. For illustrative purposes, the process 300 is described from the perspective of a computer system.

Referring to the process 300 of FIGS. 3A and 3B, the computer system can receive user input including a user model in block 302.

In block 304, the computer system can transform the user model into a risk-aware model. Refer to FIG. 2 for further discussion.

The computer system can receive a user input for the user model in block 306. Sometimes block 306 can be the same as the block 302. Block 306 can also be performed before, during, or after block 302 and/or block 304. If the user model is a language model, the user input can include additional information, such as instructions that can be added to the prompt to cause the model to break up its logic into composable pieces once it receives a prompt as input. These instructions can be used to cause the model reason consistently for purposes of TOT.

In block 310, the computer system can then apply the risk-aware model to the user input to generate model output and corresponding risk values. If the sequence model is language based, this output can include individual tokens that are appended to the original input autoregressively. During each autoregressive step, tokens can be selected from an output logit vector, for example by stochastically sampling the softmax probabilities of the logits with a predetermined temperature parameter.

In case of other data modalities (e.g., image generation) where the model does not directly input text instructions, the disclosed techniques can introduce stochasticity into the model (e.g., dropout layers, Bayesian layers) and execute that model several times, each time producing a different output.

For example, the model output can include output representing one or more tokens forming thoughts or image frames that can be appended to generate a video clip (block 312)

Additionally or alternatively, the corresponding risk values can include aleatoric uncertainty values corresponding to each output or sequence (block 314). Additionally or alternatively, the corresponding risk values can include epistemic uncertainty values corresponding to each output or sequence (block 316). Additionally or alternatively, the corresponding risk values can include bias values corresponding to each output or sequence (block 318).

In block 320, the computer system can determine whether processing conditions have been met to stop applying the model to the user-provided input. In a case of language modeling (e.g., natural language processing (NLP)), the determination can be made by the computer system based on verifying whether a sequence of generated outputs form a complete thought.

If the processing condition(s) is not met, then the computer system can return to block 310 and continue generating model output and corresponding risk values until the processing condition(s) is met. For example, the computer system can continue to perform blocks 310-320 until the model generates an end-of-thought token that indicates the model has finished generating the current thought.

If the processing condition(s) is met in block 320, the computer system can compute an aggregated risk value for the combined model outputs that satisfies the processing condition(s) (block 322). In other words, the computer system can compute an aggregated risk value based on, at least in part, all the aggregated outputs that was generated. For example, in the case of NLP, the computer system can determine an average of the risks for the generated tokens. The computer system may determine the aggregated risk value based on the aleatoric uncertainty value(s), the epistemic uncertainty value(s), the bias value(s), or any combination thereof.

The per-token uncertainty values can be aggregated into a single score, or set of scores, representing combined risk for the entire thought. The disclosure herein does not make assumptions about the computation for aggregating output risk into the scores associated with each node in the TOT. Any algorithm, including but not limited to an NN model, can be used to transform the output risk into the node score (e.g., reward associated with visiting the node). The aggregation can, in some implementations, be a complex calculation, which can include some combination of the risk scores and the original model outputs.

In block 324, the computer system can determine whether the last aggregated output is the final output of the sequence. If so, this output can be appended to the rest of the sequence in block 326 (in NLP, for example, this can correspond to concatenating all the vector embeddings representing different thoughts outputted by the model) before it is returned to the user in block 328.

If the last output of the sequence does not contain the final thought (in NLP, this could signal the final answer instead of thoughts, or an end-of-sequence token) in block 324, then the computer system can proceed to run a Monte Carlo Tree Search (MCTS) step, beginning with block 334, in which the computer system can determine which node in the tree (of all possible sequence continuations) to continue generating from.

Blocks 336, 338, 340, and 342 describe steps of an MCTS. In a tree structure defined by MCTS, each node can have a state that incorporates the concatenated steps of all parent nodes until a root node. Each node also can have an associated value defined by an expression score that incorporates variables, such as how many times that node has been explored, the estimated risk value for that step, or others. The disclosure can use risk associated with the output tokens to compute the score for each node, as described above.

During a selection phase of the MCTS (block 336), starting from the root node, a child can be selected iteratively by the computer system. This selection can be based, at least in part, on which child node has a highest score. This selection process can be done iteratively until a leaf node is reached.

During an expansion phase of the MCTS (block 338), the appended states of all parent nodes can be provided, by the computer system, as an input to the sequence model such that the model output may be based on the concatenated previous outputs. In the NLP example, this can include, for example, individual thoughts linked together in series (concatenated) such that the LLM is predicting the next thought or the final thought based on all previous thoughts. This expansion may, in at least some implementations, run only once per MCTS operation.

A simulation phase can then be performed by the computer system in block 340. Sometimes, the simulation phase may not require any additional compute. During the expansion operation (block 338), a new operation of the output can predict an aggregated risk value. This risk value can be used as the result simulation phase in block 340. In an illustrative example of a game of Go (a strategic game with a goal to control territory by surrounding empty points or your opponent's stones on a board), the simulation phase (block 34) may normally output a win probability for that particular operation. However, the "win probability" can be generalized by the computer system as an inverse of risk scores for that operation.

During a backpropagation phase (block 342), the calculated risk value can be backpropagated to all the parent nodes by the computer system. For each parent node, its risk value and the newly predicted risk value can be averaged together. This can result in a score change of parent nodes such that the next selection phase (block 336) can lead to an expansion of either the same or another leaf node. The score associated with each node can balance exploration (e.g., whether or not to select a different part of the tree that has not been explored enough) and exploitation (e.g., whether or not to select a part of the tree that is estimated to have a higher score).

The process 300 can stop after performing the backpropagation phase in block 342. In some implementations, after performing the backpropagation phase, the computer system can return to performing block 310 as described above.

FIG. 4 is an example algorithm 400 for uncertainty-aware selective question answering using the disclosed technology. Given an input prompt x, a QA task can be to output a prediction $\hat{y}$ where $\hat{y} \in Y(x)$, a set of all possible responses, that correctly answers the question of the QA task. In the selective QA task, the model also outputs σ, an uncertainty estimate for a given output $\hat{y}$, where $\sigma \in R$. Given a threshold $\gamma \in R$, the model outputs $\hat{y}$ if $\sigma < \gamma$ and refrains from responding if this condition is not met. Each γ value results in quantities for coverage (e.g., a ratio of questions the model chose to respond to), and accuracy, (e.g., a number of predictions that correctly answer the question). The goal can be to maximize the number of questions that can be answered accurately, that is, to increase both coverage and accuracy. As described herein, a model can be converted into an uncertainty-aware variant that can output aleatoric, epistemic, and/or composed (e.g., bias) uncertainty estimates for every prediction. The model can learn data-dependent thresholds γ and outputs answers $(\hat{y}, \sigma)$ where $\sigma < \gamma$. The model can forgo providing responses to questions where no candidate with this requirement may exist.

In an extractive QA task, each input x represents (c, q), which is composed of context text c and a question q. The space of possible answer candidates $y \in Y(x)$ is sequential segments in c as defined by start and end indices within $c = c_0, c_1, \ldots, c_n$ with each index representing a token in the text. Stanford Question Answering Dataset (SQuAD) can be considered as an illustrative example, which is a collection of questions with corresponding answers presented as segments from passages of text. In an illustrative example of the disclosed techniques, Bidirectional Encoder Representations from Transformers (BERT) can be used, more specifically BERT-base-uncased 108M, which is a pre-trained transformer-based language model with 12 layers and 108 million parameters, designed for various natural language processing tasks and can process text without distinguishing between uppercase and lowercase letters (uncased), can be used with the WordPiece Tokenizer, as a base model to define probability distributions $f(y|x)$ over $Y(x)$. This model can be converted into an uncertainty-aware variant that outputs uncertainty for each index in the context text for every prediction.

In a generative QA task, input prompts x can be composed of sequences of tokens $x_0, x_1, \ldots x_n$ representing questions. A model can be used to incrementally predict each subsequent token, starting from the last token in the input prompt, to compose a response $\hat{y} = \hat{y}_0, \hat{y}_1, \ldots, \hat{y}_n$ that correctly answers the question. The space of answer candidates $y \in Y(x)$ includes possible sequential combinations of tokens in a given vocabulary. In an illustrative example of the disclosed techniques, TruthfulQA question answering benchmark can be used, in which 817 questions divided into several categories are meant to represent questions commonly answered incorrectly by humans and therefore likely to be learned by models imitating human text. Llama 2, more specifically Llama 2-Chat 7B, can also be used, which was fine-tuned for dialogue use cases with a vocabulary of about 32,000 tokens as the generative model. This model can be converted into an uncertainty-aware variant that outputs uncertainty estimates for the entire vocabulary for every predicted token.

The extractive model, BERT-base-uncased described above, can be pre-trained using one or more different sources. The model can further be trained for one or more epochs (e.g., 3 epochs) on a range of training samples, such as within a range of 100 to 500 (e.g., 130 to 319, inclusive) training samples provided in the SQuAD 2.0 dataset or other training dataset. The uncertainty-aware variants can be created by converting the pre-trained model before training. All the models can be evaluated on the 11,873 questions, or more questions, or fewer questions in the SQuAD 2.0 test set, reporting accuracy for Exact Match and F1 metrics. In some implementations, a NVIDIA Modeling framework (NeMo framework) can be used to train and evaluate the models. The NeMo framework facilitates the creation, training, and deployment of deep learning models, particularly for applications in NLP, speech recognition, and other AI-driven tasks. The generative model, Llama 2-Chat 7B, can be pre-trained and fine-tuned for dialogue use cases. The uncertainty-aware variant can be created by converting this version of the model directly.

Aleatoric uncertainty captures incertitude resulting from data (e.g., irreducible noise, labeling errors, classes with low separation, etc.). This type of uncertainty quantifies what a model cannot understand given the data provided. Aleatoric uncertainty can be modeled using Mean and Variance Estimation (MVE). In regression, a layer can predict model output deviations and can be trained using a negative log-likelihood loss. It can be assumed that logits are drawn from a normal distribution and can stochastically sample from them using a re-parameterization trick. Stochastic samples can be averaged and backpropagated using cross entropy loss through logits and their inferred uncertainties.

Epistemic uncertainty captures uncertainty arising from a predictive process. This type of uncertainty quantifies inherent limitations in a model or lack of knowledge, intuitively representing what the model does not know. A Bayesian neural network can be approximated by stochastically sampling, during inference, from a model with probabilistic layers. Similarly, models of arbitrary depth that follow sampling-based procedures to temporarily remove units from all layers can be equivalent to approximations to the probabilistic deep Gaussian process and can be used to estimate predictive uncertainty. Epistemic uncertainty can be calculated, in some implementations, for example, using Monte Carlo sampling (MC) (e.g., running T stochastic forward passes and computing the first and second moments from these samples, yielding predictions and uncertainty estimates, respectively). Ensembles of N models, each a randomly initialized stochastic sample, can be another approach used to estimate epistemic uncertainty.

Traditionally, models output predictions in the form of $\hat{y}=f_W(x)$. The disclosed techniques apply a conversion, $\Phi$, to build an uncertainty-aware model to measure uncertainty metrics $\theta$:

$$g(\cdot)\leftarrow\Phi_\theta(f_W),$$

$$\hat{y},\sigma=g(x)$$

where $\sigma$ is the estimated uncertainty. The disclosed conversion procedure adds and modifies relevant model components while preserving structure and function. This allows the new model to serve as a drop-in replacement that can additionally be able to estimate uncertainty metrics. The modifications can be integrated into a custom, metric-specific forward pass and training step that integrates during training and inference.

FIG. 5 is a table 700 illustrating accuracy of a model per uncertainty method using the disclosed technology. As initial example evaluations, MVE, MC, and Ensemble variants of a pre-trained extractive QA model are created. In this illustrative example, these variants are trained for 3 epochs on approximately 130,000 samples provided in the SQuAD 2.0 dataset. Exact Match and F1 accuracy results can be collected for approximately 11,000 test questions. As shown by the table 500, the uncertainty-aware variants have performance that is consistent with the base model with no significant reductions in accuracy.

Figure 6:
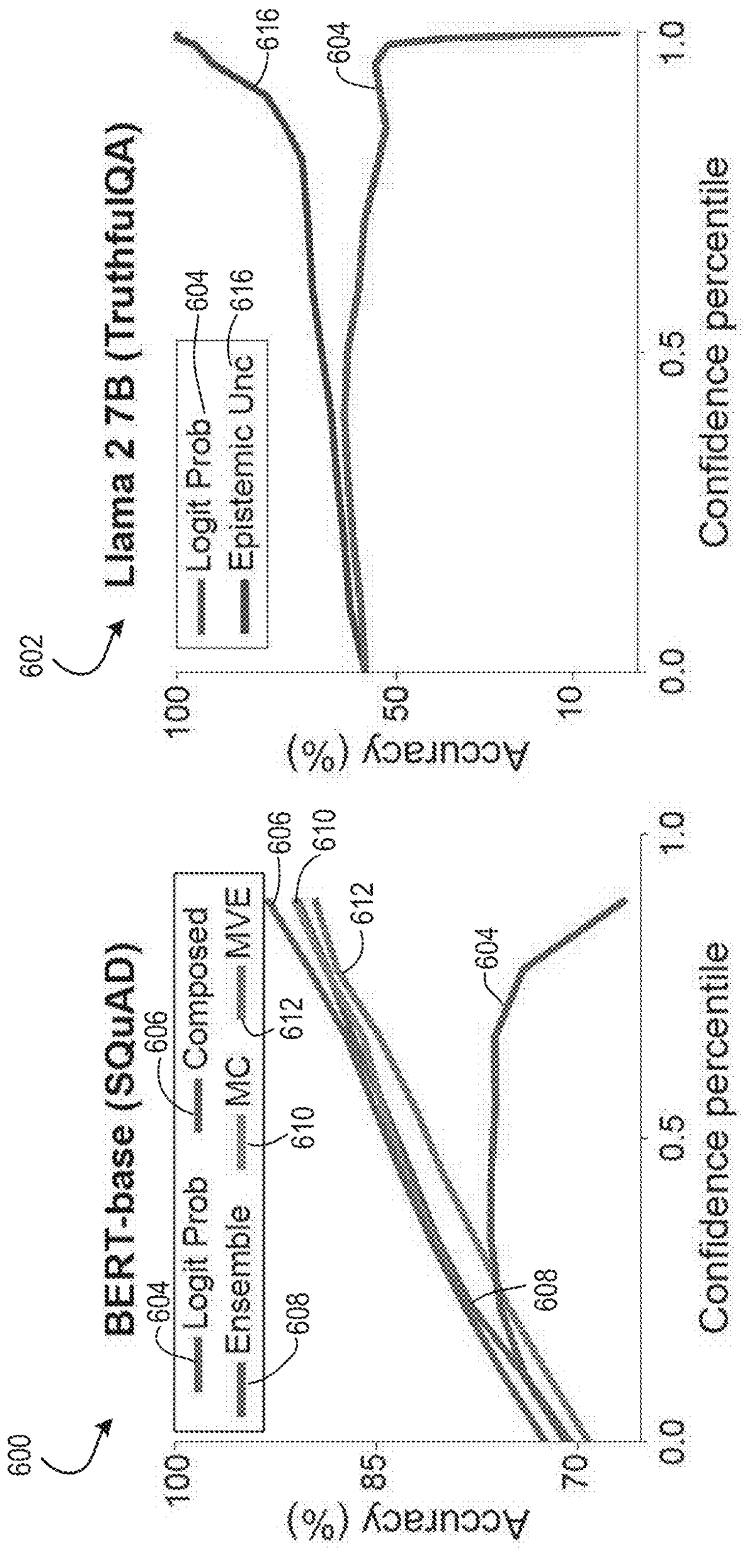
FIG. 6 illustrates graphs of selective answering accuracy by confidence level.

FIG. 6 illustrates graphs 600 and 602 of selective answering accuracy by confidence level. FIG. 7 is a table 700 illustrating example selective question answering accuracy from performing the disclosed technology. Referring to both FIGS. 6 and 7, accuracy of a model across increasing levels of confidence percentile thresholds (e.g., top to bottom, least to most confident) are shown when using the disclosed technology. Bold entries in the table 700 of FIG. 7 indicate top performing uncertainty method per confidence level.

Increasing values of logit probability may not correspond to increased question answering ability, despite being often misconceived as a measure of confidence. The disclosed techniques, on the other hand, report a reliable measure of confidence with increased confidence corresponding to increased accuracy. Having verified that QA performance remains consistent after model conversions, performance of different UQ variants can be compared on an uncertainty-guided selective QA setting. For an extractive QA task, models can be evaluated on approximately 5928 answerable questions in the SQuAD test set described herein, as an illustrative example. For a generative QA task, multiple responses to 817 questions in the TruthfulQA benchmark can be generated, as another illustrative example.

Coverage and accuracy obtained by the MVE, Ensemble, and/or MC UQ variants described above can be compared when answering questions using their uncertainty estimates as the selective prediction criteria. The UQ variants may also be compared to the original model, using baseline logit probabilities (e.g., from softmax) as a confidence value to guide selective predictions. The logit probabilities refer to the transformed output of a model's raw predictions, where logits are the unbounded values (often from the last layer of a neural network) that are converted into probabilities using a function like the softmax (for multi-class classification) or sigmoid (for binary classification). These results are shown by the graphs 600 and 602 of FIG. 6. These results are also shown in table 700 of FIG. 7, described further below.

Using UQ metrics as a measure of confidence can lead to increased accuracy while answering larger portions of the questions. On the other hand, using logit probability does not. Additionally, in both the extractive and generative cases, predictions are least accurate when logit probability confidence is highest. In fact, performance gradually deteriorates to 0% as confidence increases, indicating logit confidence percentile.

Probabilities (e.g., from softmax) may not be used reliably to determine answer confidence. Moreover, as shown in FIG. 6, the highest performance achieved using logit probability, 76.50% accuracy for 60% of questions in the extractive case, and 61.87% accuracy for 60% of questions in the generative case, is significantly lower than those achieved using UQ metrics. In the extractive case, MVE 612 and Ensemble 608 result in approximately 100% accuracy when answering questions in the top confidence percentile. MVE 612, Ensemble 608, and MC 610 obtain +90% accuracy with coverage rates of 5%, 15%, and 15%, respectively, and +80% accuracy with coverage rates of 50%, 65%, and 75%, respectively. Ensemble 608 is able to reach 100% accuracy with the highest overall performance across all confidence levels, as shown by the graph 600 of FIG. 6. All the converted models are able to consistently, throughout the entire set of questions, identify predictions likely to be incorrect. In the generative case, using baseline logit probability 604 to measure confidence leads to a maximum increase in accuracy of 4.7% for questions in the 4th lowest percentile. In comparison, the disclosed uncertainty-aware models 616 can attain accuracy rates of 100%, +90%, +80%, +70% when answering 1%, 8%, 9%, and 35% of the questions, respectively, and result in higher accuracy across all confidence percentiles. After generating 10 candidate answers for each question in the benchmark, answers with highest uncertainty were consistently incorrect, in an illustrate example use case of the disclosed technology. The converted model may also be able to output correct answers if it repeatedly generates predictions until one in the 99% confidence percentile is found.

The disclosed techniques can similarly be used to generate a compositional UQ method with strong accuracy that does not require the training of multiple independent models or incur significant computational costs. MC 610 can be used as an epistemic uncertainty metric given that it can be more computationally efficient than Ensemble models. The measurement can be combined with MVE 612, which estimates aleatoric uncertainty, to create a model that calculates this composed metric with every output. The composed approach, as shown by the graphs 600 and 602 of FIG. 6 and the table 700 of FIG. 7, attained significantly higher accuracy when compared to other independent UQ metrics. Importantly, the composed approach does not incur significant computational overhead required by Ensembling-based approaches. The automated uncertainty-awareness techniques described herein enable facile composition of different UQ methods to optimize for both performance and computational efficiency, and enables strong effectiveness on selective question answering tasks.

FIG. 8 is a table 800 illustrating an example efficiency benchmark per uncertainty method that can be used with the disclosed techniques. The table 800 provides results relating to computational performance. Models that are made risk-aware incur minimal overhead in inference time and a negligible increase in number of parameters. However, the Ensemble variant, on the other hand, results in significant computational cost, approximately five times that of the original model. The disclosed automatic uncertainty-aware conversion process is completed in about 0.0994 seconds for an example 108 million parameters model and in 1.3856 seconds for an example 7 billion parameters model. The latter model has significantly more learnable parameters.

Computing System(s) for Use with Present Disclosures.

Figure 9:
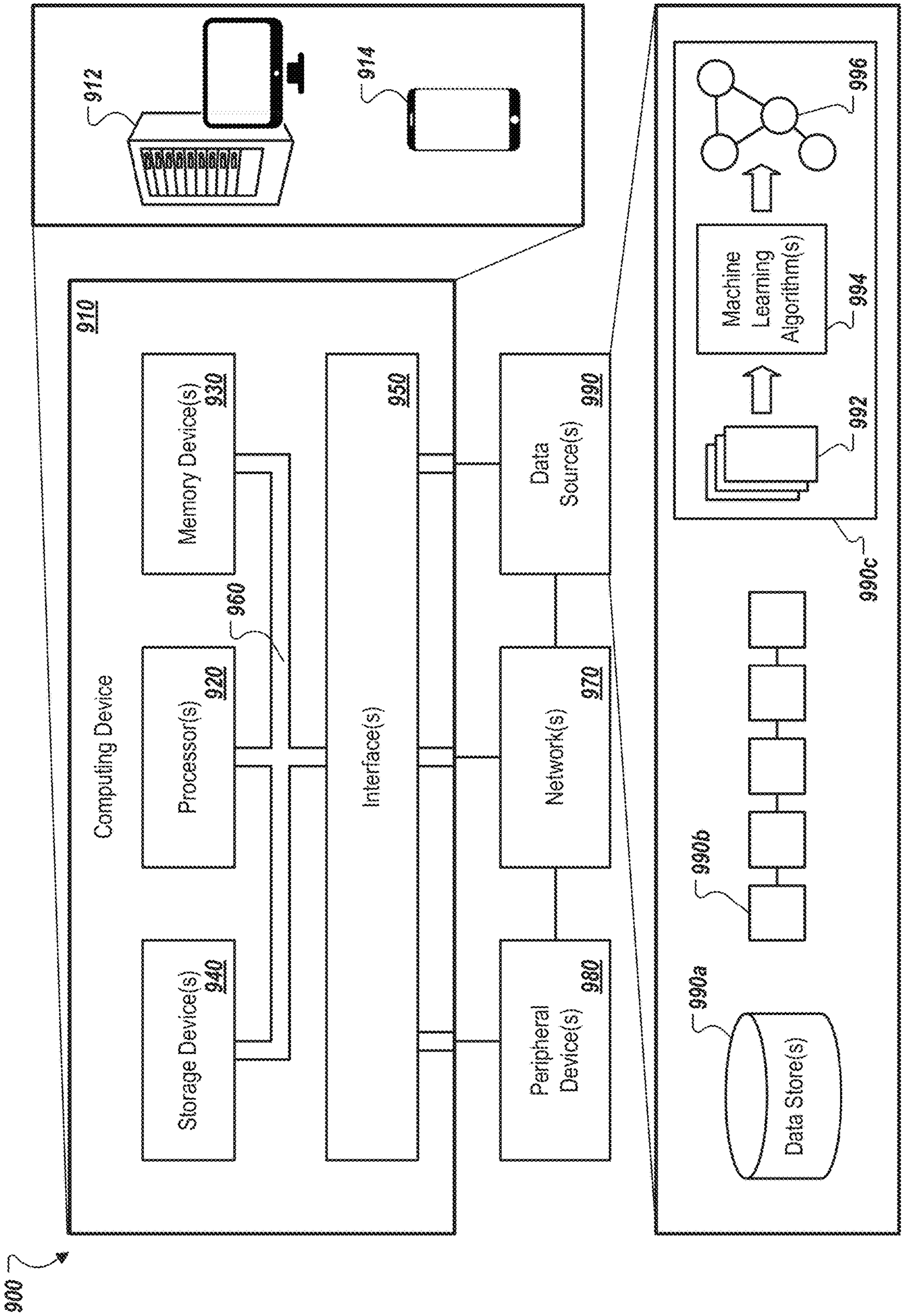
FIG. 9 is a schematic diagram that shows an example of a computing system that can be used to implement the techniques described herein.

FIG. 9 is a schematic diagram that shows an example of a computing system 900 that can be used to implement the techniques described herein. The computing system 900 includes one or more computing devices (e.g., computing device 910), which can be in wired and/or wireless communication with various peripheral device(s) 980, data source(s) 990, and/or other computing devices (e.g., over network(s) 970). The computing device 910 can represent various forms of stationary computers 912 (e.g., workstations, kiosks, servers, mainframes, edge computing devices, quantum computers, etc.) and mobile computers 914 (e.g., laptops, tablets, mobile phones, personal digital assistants, wearable devices, etc.). In some implementations, the computing device 910 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 910, and an entire system can be made up of multiple devices communicating with each other. For example, the computing device 910 can be part of a computing system that includes a network of computing devices, such as a cloud-based computing system, a computing system in an internal network, or a computing system in another sort of shared network. Processors of the computing device (910) and other computing devices of a computing system can be optimized for different types of operations, secure computing tasks, etc. The components shown herein, and their functions, are meant to be examples, and are not meant to limit implementations of the technology described and/or claimed in this document.

The computing device 910 includes processor(s) 920, memory device(s) 930, storage device(s) 940, and interface(s) 950. Each of the processor(s) 920, the memory device(s) 930, the storage device(s) 940, and the interface(s) 950 are interconnected using a system bus 960. The processor(s) 920 are capable of processing instructions for execution within the computing device 910, and can include one or more single-threaded and/or multi-threaded processors. The processor(s) 920 are capable of processing instructions stored in the memory device(s) 930 and/or on the storage device(s) 940. The memory device(s) 930 can store data within the computing device 910, and can include one or more computer-readable media, volatile memory units, and/or non-volatile memory units. The storage device(s) 940 can provide mass storage for the computing device 910, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 950 can include various communications interfaces (e.g., USB, Near-Field Communication (NFC), Bluetooth, WiFi, Ethernet, wireless Ethernet, etc.) that can be coupled to the network(s) 970, peripheral device(s) 980, and/or data source(s) 990 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 950 can include a control interface that receives commands from an input device (e.g., operated by a user) and converts the commands for submission to the processors 920. The interface(s) 950 can include a display interface that includes circuitry for driving a display to present visual information to a user. The interface(s) 950 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 970 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 910 can communicate with the peripheral device(s) 980, the data source(s) 990, and/or other computing devices over the network(s) 970. In some implementations, the computing device 910 can directly communicate with the peripheral device(s) 980, the data source(s), and/or other computing devices.

The peripheral device(s) 980 can provide input/output operations for the computing device 910. Input devices (e.g., keyboards, pointing devices, touchscreens, microphones, cameras, scanners, sensors, etc.) can provide input to the computing device 910 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 910 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 990 can provide data for use by the computing device 910, and/or can maintain data that has been generated by the computing device 910 and/or other devices (e.g., data collected from sensor devices, data aggregated from various different data repositories, etc.). In some implementations, one or more data sources can be hosted by the computing device 910 (e.g., using the storage device(s) 940). In some implementations, one or more data sources can be hosted by a different computing device. Data can be provided by the data source(s) 990 in response to a request for data from the computing device 910 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 990*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 990*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 990*c*. The machine learning system(s) 990*c*, for example, can be used to analyze data from various sources (e.g., data provided by the computing device 910, data from the data store(s) 990*a*, data from the blockchain(s) 990*b*, and/or data from other data sources), to identify patterns in the data, and to draw inferences from the data patterns. In general, training data 992 can be provided to one or more machine learning algorithms 994, and the machine learning algorithm(s) can generate a machine learning model 996. Execution of the machine learning algorithm(s) can be performed by the computing device 910, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for improving accuracy of model output generation, the method comprising:

receiving a user model and a user input, wherein the user input comprises a prompt;

transforming the user model into a risk-aware variant of the user model based on applying a wrapper-specific algorithm to the user model, wherein transforming the user model comprises modifying one or more components of the user model to integrate an uncertainty estimation into the user model such that the risk-aware variant of the user model is configured to compute risk values during inference;

iteratively processing the prompt by the risk-aware variant of the user model until the risk values computed during inference are less than a threshold risk value, wherein each iteration of the iterative processing comprises:

applying the risk-aware variant of the user model to the prompt;

receiving, based on the applying, model output and corresponding risk values;

determining whether one or more of the corresponding risk values is less than the threshold risk value;

modifying the prompt based on a determination that the one or more of the corresponding risk values is greater than or equal to the threshold risk value; and setting the modified prompt as the prompt for subsequent iterations of the iterative processing based on the determination that the one or more of the corresponding risk values is greater than or equal to the threshold risk value;

selecting the modified prompt having the one or more corresponding risk values that is less than the threshold risk value; and returning the selected prompt for runtime execution with the risk-aware variant of the user model.

2. The method of claim 1, wherein output generated by the risk-aware variant of the user model comprises one or more sequences, wherein each sequence in the one or more sequences comprises one or more tokens or one or more thoughts generated by the risk-aware variant of the user model.

3. The method of claim 2, wherein the corresponding risk values comprise an aleatoric uncertainty value corresponding to each sequence.

4. The method of claim 2, wherein the corresponding risk values comprise an epistemic uncertainty value corresponding to each sequence.

5. The method of claim 2, wherein the corresponding risk values comprise a bias value corresponding to each sequence.

6. The method of claim 1, the method further comprising:

aggregating the corresponding risk values to generate an aggregated risk value;

determining whether the aggregated risk value is less than the threshold risk value; and in response to determining that the aggregated risk value is greater than or equal to the threshold risk value, performing the modifying.

7. A system for improving accuracy of model output generation, the system comprising:
- a computer system comprising one or more processors and memory storing instructions that, when executed by the one or more processors, cause the computer system to perform a process comprising:
  - receiving a user model and a user input, wherein the user input comprises a prompt;
  - transforming the user model into a risk-aware variant of the user model based on applying a wrapper-specific algorithm to the user model, wherein transforming the user model comprises modifying one or more components of the user model to integrate an uncertainty estimation into the user model such that the risk-aware variant of the user model is configured to compute risk values during inference;
  - iteratively processing the prompt by the risk-aware variant of the user model until the risk values computed during inference are less than a threshold risk value, wherein each iteration of the iterative processing comprises:
    - applying the risk-aware variant of the user model to the prompt;
    - receiving, based on the applying, model output and corresponding risk values;
    - determining whether one or more of the corresponding risk values is less than the threshold risk value;
    - modifying the prompt based on a determination that the one or more of the corresponding risk values is greater than or equal to the threshold risk value; and
    - setting the modified prompt as the prompt for subsequent iterations of the iterative processing based on the determination that the one or more of the corresponding risk values is greater than or equal to the threshold risk value;
  - selecting the modified prompt having the one or more corresponding risk values that is less than the threshold risk value; and
  - returning the selected prompt for runtime execution with the risk-aware variant of the user model.

8. The system of claim 7, wherein output generated by the risk-aware variant of the user model comprises one or more sequences in a tree-of-thought (TOT) of the risk-aware variant of the user model.

9. The system of claim 7, wherein the process further comprises:
- aggregating the corresponding risk values to generate an aggregated risk value;
- determining whether the aggregated risk value is less than the threshold risk value; and
- in response to determining that the aggregated risk value is greater than or equal to the threshold risk value, performing the modifying.

10. The method of claim 1, further comprising:
- terminating the iterative processing based on reaching a predetermined number of iterations without the risk values being less than the threshold risk value; and
- instructing the risk-aware variant of the user model to decline responding to the prompt based on the terminating.

11. The method of claim 1, wherein the uncertainty estimation is integrated into a forward pass of the user model.

12. The system of claim 7, wherein the uncertainty estimation is integrated into a forward pass of the user model.

13. The system of claim 7, wherein the corresponding risk values comprise at least one of an aleatoric uncertainty value, an epistemic uncertainty value, or a bias value.

14. The method of claim 1, wherein the returning comprises returning the selected prompt for runtime execution with a second model that is different from the user model and the risk-aware variant of the user model.

15. The method of claim 1, wherein the corresponding risk values comprise at least one of an aleatoric uncertainty value, an epistemic uncertainty value, or a bias value.

16. The method of claim 1, wherein the modification of the prompt is made based on the corresponding risk values to identify one or more portions of the prompt contributing to the corresponding risk values exceeding the threshold risk value.

17. The system of claim 7, wherein the modification of the prompt is made based on the corresponding risk values to identify one or more portions of the prompt contributing to the corresponding risk values exceeding the threshold risk value.

18. The method of claim 2, wherein the one or more sequences are organized as a TOT.

19. The method of claim 1, wherein modifying the prompt further comprises prepending the prompt with logical instructions.

20. A non-transitory computer-readable medium storing instructions that, when executed by one or more processors, cause the one or more processors to perform operations for improving accuracy of model output generation, the operations comprising:
- receiving a user model and a user input, wherein the user input comprises a prompt;
- transforming the user model into a risk-aware variant of the user model based on applying a wrapper-specific algorithm to the user model, wherein transforming the user model comprises modifying one or more components of the user model to integrate an uncertainty estimation into the user model such that the risk-aware variant of the user model is configured to compute risk values during inference;
- iteratively processing the prompt by the risk-aware variant of the user model until the risk values computed during inference are less than a threshold risk value, wherein each iteration of the iterative processing comprises:
  - applying the risk-aware variant of the user model to the prompt;
  - receiving, based on the applying, model output and corresponding risk values;
  - determining whether one or more of the corresponding risk values is less than the threshold risk value;
  - modifying the prompt based on a determination that the one or more of the corresponding risk values is greater than or equal to the threshold risk value; and
  - setting the modified prompt as the prompt for subsequent iterations of the iterative processing based on the determination that the one or more of the corresponding risk values is greater than or equal to the threshold risk value;
- selecting the modified prompt having the one or more corresponding risk values that is less than the threshold risk value; and
- returning the selected prompt for runtime execution with the risk-aware variant of the user model.

21. The non-transitory computer-readable medium of claim 20, wherein output generated by the risk-aware variant of the user model comprises one or more sequences, wherein each sequence in the one or more sequences comprises one or more tokens or one or more thoughts generated by the risk-aware variant of the user model.

22. The non-transitory computer-readable medium of claim 21, wherein the corresponding risk values comprise an aleatoric uncertainty value corresponding to each sequence.

23. The non-transitory computer-readable medium of claim 21, wherein the corresponding risk values comprise an epistemic uncertainty value corresponding to each sequence.

24. The non-transitory computer-readable medium of claim 21, wherein the corresponding risk values comprise a bias value corresponding to each sequence.

25. The non-transitory computer-readable medium of claim 20, wherein the operations further comprise:

aggregating the corresponding risk values to generate an aggregated risk value;

determining whether the aggregated risk value is less than the threshold risk value; and in response to determining that the aggregated risk value is greater than or equal to the threshold risk value, performing the modifying.

26. The non-transitory computer-readable medium of claim 20, wherein modifying the prompt further comprises prepending the prompt with logical instructions.

* * * * *